(12) United States Patent
Teixeira (10) Patent No.: US 10,364,748 B2
(45) Date of Patent: Jul. 30, 2019

(54) FINGER SEAL FLOW METERING

(71) Applicant: United Technologies Corporation, Farmington, CT (US)

(72) Inventor: John D Teixeira, Palm City, FL (US)

(73) Assignee: United Technologies Corporation, Farmington, CT (US)

( * ) Notice: Subject to any disclaimer, the term of this patent is extended or adjusted under 35 U.S.C. 154(b) by 468 days.

(21) Appl. No.: 15/241,753

(22) Filed: Aug. 19, 2016

(65) Prior Publication Data

US 2018/0051629 A1    Feb. 22, 2018

(51) Int. Cl.
*F02C 6/04* (2006.01)
*F02C 7/18* (2006.01)
*F02C 7/28* (2006.01)
*F01D 11/00* (2006.01)

(52) U.S. Cl.
CPC .............. *F02C 7/18* (2013.01); *F01D 11/005* (2013.01); *F02C 7/28* (2013.01); *F05D 2240/57* (2013.01)

(58) Field of Classification Search
CPC .. F01D 11/005; F02C 7/18; F02C 7/28; F05D 2240/57
See application file for complete search history.

(56) References Cited

U.S. PATENT DOCUMENTS

| | | | |
|---|---|---|---|
| 2,124,108 A | 7/1938 | Grece | |
| 3,576,328 A | 4/1971 | Vose | |
| 3,970,319 A | 7/1976 | Carroll et al. | |
| 4,088,422 A | 5/1978 | Martin | |
| 4,114,248 A | 9/1978 | Smith et al. | |
| 4,478,551 A | 10/1984 | Honeycutt, Jr. et al. | |
| 4,613,280 A * | 9/1986 | Tate ...................... | F01D 11/005 415/110 |
| 4,645,217 A * | 2/1987 | Honeycutt, Jr. ...... | F01D 11/005 277/555 |
| 4,678,113 A | 7/1987 | Bridges et al. | |
| 4,723,441 A | 2/1988 | Sweeney | |
| 4,738,453 A | 4/1988 | Ide | |
| 4,756,536 A | 7/1988 | Belcher | |
| 4,805,398 A * | 2/1989 | Jourdain ................. | F01D 5/082 236/93 R |
| 4,920,742 A | 5/1990 | Nash et al. | |
| 4,987,736 A | 1/1991 | Ciokajlo et al. | |
| 4,993,918 A | 2/1991 | Myers et al. | |

(Continued)

FOREIGN PATENT DOCUMENTS

| | | |
|---|---|---|
| EP | 1801359 A2 | 6/2007 |
| EP | 2871326 A1 | 5/2015 |

(Continued)

OTHER PUBLICATIONS

Extended European Search Report, for European Patent Application No. 17184540.7, dated Jan. 22, 2018, 10 pages.

*Primary Examiner* — Jesse S Bogue
(74) *Attorney, Agent, or Firm* — Kinney & Lange, P.A.

(57) ABSTRACT

A seal includes two layers, each layer including a base and fingers extending from the base. The fingers are separated by slots and the fingers include orifices. The slots of each layer are laterally spaced apart from each other. The orifices of one of the layers are partially overlapped by the orifices of the other layer so that the areas of the partially overlapped orifices extend beyond the areas of the overlapping orifices.

17 Claims, 6 Drawing Sheets

(56) References Cited

U.S. PATENT DOCUMENTS

| | | | |
|---|---|---|---|
| 5,031,922 A | 7/1991 | Heydrich | |
| 5,042,823 A | 8/1991 | Mackay et al. | |
| 5,064,343 A * | 11/1991 | Mills | F01D 11/16 |
| | | | 415/115 |
| 5,071,138 A | 12/1991 | Mackay et al. | |
| 5,100,158 A | 3/1992 | Gardner | |
| 5,108,116 A | 4/1992 | Johnson et al. | |
| 5,169,159 A | 12/1992 | Pope et al. | |
| 5,174,584 A | 12/1992 | Lahrman | |
| 5,188,507 A | 2/1993 | Sweeney | |
| 5,211,541 A | 5/1993 | Fledderjohn et al. | |
| 5,236,302 A | 8/1993 | Weisgerber et al. | |
| 5,246,295 A | 9/1993 | Ide | |
| 5,273,397 A | 12/1993 | Czachor et al. | |
| 5,338,154 A | 8/1994 | Meade et al. | |
| 5,370,402 A | 12/1994 | Gardner et al. | |
| 5,385,409 A | 1/1995 | Ide | |
| 5,401,036 A | 3/1995 | Basu | |
| 5,474,305 A | 12/1995 | Flower | |
| 5,558,341 A | 9/1996 | McNickle et al. | |
| 5,560,198 A * | 10/1996 | Brewer | F02K 1/80 |
| | | | 277/628 |
| 5,632,493 A | 5/1997 | Gardner | |
| 5,649,806 A * | 7/1997 | Scricca | F01D 11/08 |
| | | | 415/115 |
| 5,755,445 A | 5/1998 | Arora | |
| 5,911,400 A | 6/1999 | Niethammer et al. | |
| 5,931,184 A | 8/1999 | Armenia et al. | |
| 5,961,279 A | 10/1999 | Ingistov | |
| 6,196,550 B1 | 3/2001 | Arora et al. | |
| 6,343,912 B1 | 2/2002 | Manteiga et al. | |
| 6,364,316 B1 | 4/2002 | Arora | |
| 6,439,841 B1 | 8/2002 | Bosel | |
| 6,601,853 B2 | 8/2003 | Inoue | |
| 6,619,030 B1 | 9/2003 | Seda et al. | |
| 6,637,751 B2 | 10/2003 | Aksit et al. | |
| 6,638,013 B2 | 10/2003 | Nguyen et al. | |
| 6,652,229 B2 | 11/2003 | Lu | |
| 6,736,401 B2 | 5/2004 | Chung et al. | |
| 6,805,356 B2 | 10/2004 | Inoue | |
| 6,811,154 B2 | 11/2004 | Proctor et al. | |
| 6,935,631 B2 | 8/2005 | Inoue | |
| 6,983,608 B2 | 1/2006 | Allen, Jr. et al. | |
| 7,094,026 B2 | 8/2006 | Coign et al. | |
| 7,238,008 B2 | 7/2007 | Bobo et al. | |
| 7,367,567 B2 * | 5/2008 | Farah | F01D 11/003 |
| | | | 277/650 |
| 7,371,044 B2 | 5/2008 | Nereim | |
| 7,631,879 B2 | 12/2009 | Diantonio | |
| 7,735,833 B2 | 6/2010 | Braun et al. | |
| 7,798,768 B2 | 9/2010 | Strain et al. | |
| 8,069,648 B2 | 12/2011 | Snyder et al. | |
| 8,083,465 B2 | 12/2011 | Herbst et al. | |
| 8,152,451 B2 | 4/2012 | Manteiga et al. | |
| 8,221,071 B2 | 7/2012 | Wojno et al. | |
| 8,245,518 B2 | 8/2012 | Durocher et al. | |
| 8,985,592 B2 * | 3/2015 | Green | F01D 9/023 |
| | | | 277/637 |
| 9,435,266 B2 * | 9/2016 | Sutterfield | F02K 1/805 |
| 2003/0025274 A1 | 2/2003 | Allan et al. | |
| 2003/0042682 A1 | 3/2003 | Inoue | |
| 2003/0062684 A1 | 4/2003 | Inoue | |
| 2003/0062685 A1 | 4/2003 | Inoue | |
| 2005/0046113 A1 | 3/2005 | Inoue | |
| 2005/0120534 A1 | 6/2005 | Carns et al. | |
| 2007/0149031 A1 * | 6/2007 | Martin | F01D 11/005 |
| | | | 439/395 |
| 2008/0203669 A1 | 8/2008 | Schippl et al. | |
| 2010/0132371 A1 | 6/2010 | Durocher et al. | |
| 2010/0132374 A1 | 6/2010 | Manteiga et al. | |
| 2010/0132377 A1 | 6/2010 | Durocher et al. | |
| 2010/0307165 A1 | 12/2010 | Wong et al. | |
| 2011/0000223 A1 | 1/2011 | Russberg | |
| 2011/0154886 A1 | 6/2011 | Carns et al. | |
| 2011/0214433 A1 | 9/2011 | Feindel et al. | |
| 2011/0262277 A1 | 10/2011 | Sjoqvist et al. | |
| 2012/0111023 A1 | 5/2012 | Sjoqvist et al. | |
| 2013/0270777 A1 * | 10/2013 | Clouse | F16J 15/0887 |
| | | | 277/637 |
| 2015/0128610 A1 * | 5/2015 | Salunkhe | F01D 9/023 |
| | | | 60/800 |
| 2015/0354386 A1 * | 12/2015 | Chuong | F01D 25/30 |
| | | | 415/182.1 |
| 2018/0030844 A1 * | 2/2018 | White | F01D 9/023 |

FOREIGN PATENT DOCUMENTS

| | | |
|---|---|---|
| EP | 2930312 A2 | 10/2015 |
| EP | 3012493 A1 | 4/2016 |
| WO | 2014105528 A1 | 7/2014 |
| WO | 2014137444 A2 | 9/2014 |
| WO | WO2015195164 A1 | 12/2015 |

* cited by examiner

FINGER SEAL FLOW METERING

BACKGROUND

The present invention relates generally to seals, and more particularly to a finger seal with metering ports.

There are a variety of gas turbine engine configurations, including two-spool, high-bypass engines. Such an engine typically includes a high pressure spool, a combustion system and a low pressure spool disposed within an engine case to form a generally axial, serial flow path about the engine centerline. The high pressure spool includes a high pressure turbine, a high pressure shaft extending axially forward from the high pressure turbine, and a high pressure compressor connected to a forward end of the high pressure shaft. The low pressure spool includes a low pressure turbine, which is disposed downstream of the high pressure turbine, a low pressure shaft, which typically extends coaxially through the high pressure shaft, and a low pressure compressor connected to a forward end of the low pressure shaft, forward of the high pressure compressor. A fan is also connected to the low pressure spool, forward of the low pressure compressor. The combustion system is disposed between the high pressure compressor and the high pressure turbine and receives compressed air from the compressors and fuel provided by a fuel injection system. A combustion process is carried out within the combustion system to produce high energy exhaust gases to produce thrust and turn the high and low pressure turbines, which drive their respective compressors and the fan to sustain the combustion process.

The high energy gases contain a substantial amount of thermal energy, which is transferred to the high and low pressure turbines. Therefore, certain components of the high and low pressure turbines are cooled and/or pressurized using relatively cool air that is bled from the low pressure compressor, the high pressure compressor, and/or the fan bypass duct. This cooling air needs to be allowed to flow through and/or around different structures in the gas turbine engine to arrive at the targeted areas. Because the gas turbine engine has already performed some work on the cooling air, it is important to use the air wisely or else the efficiency of the engine will decrease.

SUMMARY

In one aspect, a seal includes two layers, each layer including a base and fingers extending from the base. The fingers are separated by slots and the fingers include orifices. The slots of each layer are laterally spaced apart from each other. The orifices of one of the layers are partially overlapped by the orifices of the other layer so that the areas of the partially overlapped orifices extend beyond the areas of the overlapping orifices.

In another aspect, a method of manufacturing a seal includes forming two layers each including a base and fingers extending from the base. The fingers are separated by slots and include an orifice. The layers are secured together so that the slots of each layer are laterally spaced apart from each other and the orifices of one of the layers are partially overlapped by the orifices of the other layer. A fastening feature is created on the layers for connecting the layers together.

The present summary is provided only by way of example, and not limitation. Other aspects of the present disclosure will be appreciated in view of the entirety of the present disclosure, including the entire text, claims and accompanying figures.

While the above-identified figures set forth embodiments of the present invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features, steps and/or components not specifically shown in the drawings.

DETAILED DESCRIPTION

Figure 1:
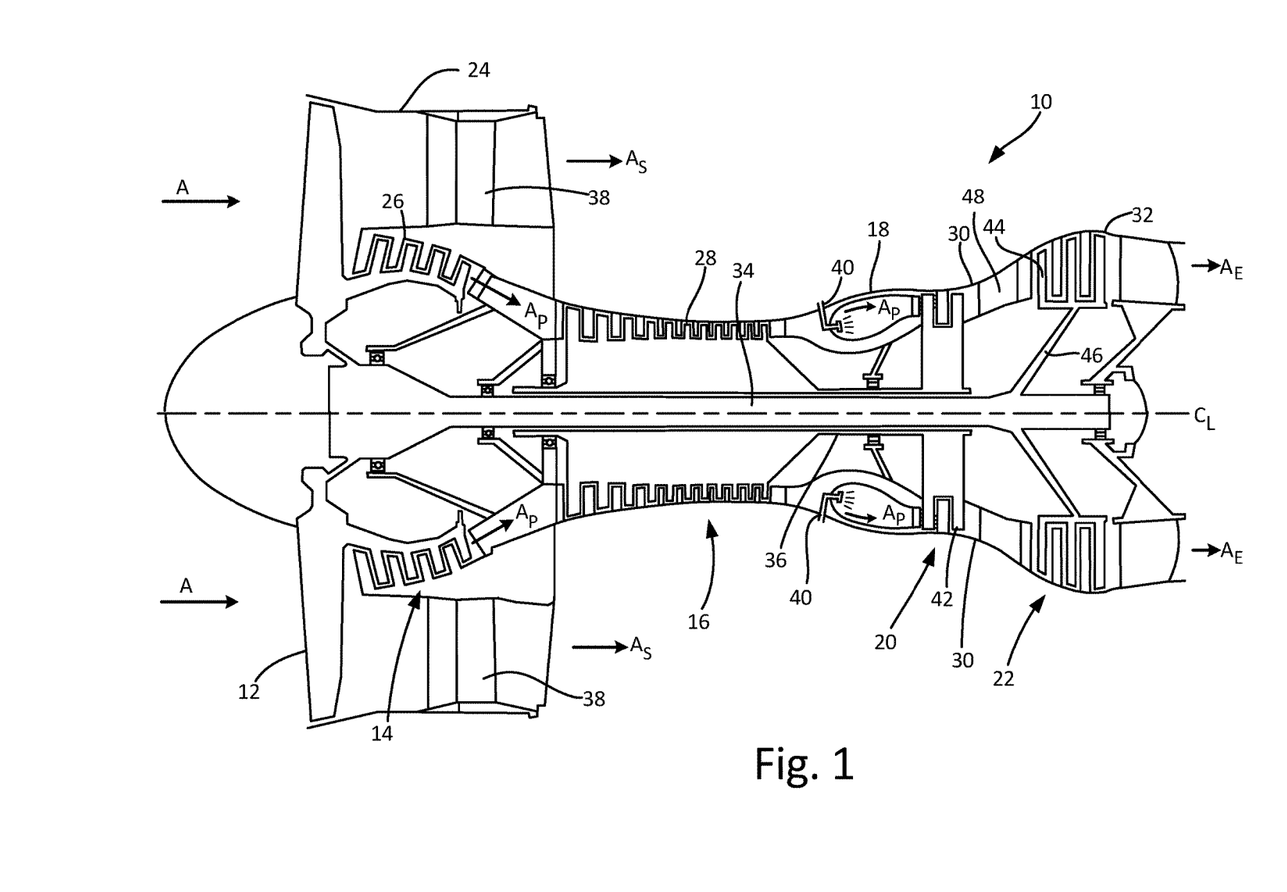
FIG. 1 is a schematic cross-sectional view of a gas turbine engine.

FIG. 1 is a schematic side cross-sectional view of gas turbine engine 10 for an aircraft (not shown). Shown in FIG. 1 are gas turbine engine 10, fan 12, low pressure compressor (LPC) 14, high pressure compressor (HPC) 16, combustor section 18, high pressure turbine (HPT) 20, low pressure turbine (LPT) 22, fan case 24, LPC case 26, HPC case 28, HPT case 30, LPT case 32, low pressure shaft 34, high pressure shaft 36, fan exit guide vanes 38, fuel injectors 40, HPT blades 42, LPT blades 44, support rotor 46, mid-turbine frame 48, inlet air A, exhaust air $A_E$, primary air $A_P$, secondary air $A_S$ (also known as bypass air), and longitudinal engine centerline axis $C_L$.

In the illustrated embodiment, gas turbine engine 10 comprises a dual-spool turbofan engine, although other engine configurations are possible in alternative embodiments. Gas turbine engine 10, of which the operational principles are well known in the art, comprises fan 12, LPC 14, HPC 16, combustor section 18, HPT 20, and LPT 22, which are each concentrically disposed around longitudinal engine centerline axis $C_L$. Fan 12 is enclosed at its outer diameter within fan case 24. Likewise, the other engine components are correspondingly enclosed at their outer diameters within various engine casings, including LPC case 26, HPC case 28, HPT case 30 and LPT case 32. Fan 12 and LPC 14 are connected to LPT 22 through low pressure shaft 34, and together with fan 12, LPC 14, LPT 22, and low pressure shaft 34 comprise the low pressure spool. HPC 16 is connected to HPT 20 through high pressure shaft 36, and together HPC 16, HPT 20, and high pressure shaft 36 comprise the high pressure spool.

During normal operation, inlet air A enters engine 10 where it is divided into streams of primary air $A_P$ and secondary air $A_S$ after passing through fan 12. Fan 12 is rotated by LPT 22 through low pressure shaft 34 (either directly as shown or through a gearbox, not shown) to accelerate secondary air $A_S$ (also known as bypass air) through fan exit guide vanes 38, thereby producing a major portion of the thrust output of engine 10. Primary air $A_P$ (also known as gas path air) is directed first into LPC 14 and then into HPC 16. LPC 14 and HPC 16 work together to incrementally increase the pressure of primary air $A_P$. HPC 16 is rotated by HPT 20 through high pressure shaft 36 to provide primary air $A_P$ to combustor section 18. The compressed air is delivered to combustor section 18, along with fuel through fuel injectors 40, such that this fuel-air mixture is ignited by ignitors (not shown) thus resulting in a combustion process which can be carried out to produce the high energy gases necessary to turn HPT 20 and LPT 22. These high energy gases continue through gas turbine engine 10 whereby they are typically passed through an exhaust nozzle (not shown) to further produce thrust.

After being compressed in LPC 14 and HPC 16 and participating in a combustion process in combustor section 18 to increase pressure and energy, primary air $A_P$ is mixed with fuel in the combustor section 18. This fuel-air mixture is ignited by ignitors (not shown) and burned in the combustor section 18 producing exhaust air $A_E$. Exhaust air $A_E$ flows through HPT 20 and LPT 22 such that HPT blades 42 and LPT blades 44 extract energy from the flow of exhaust air $A_E$. Exhaust air $A_E$ impinges on HPT blades 42 to cause rotation of high pressure shaft 36, which turns HPC 16. Exhaust air $A_E$ also impinges on LPT blades 44 to cause rotation of support rotor 46 and low pressure shaft 34, which turns fan 12 and LPC 14.

Figure 2:
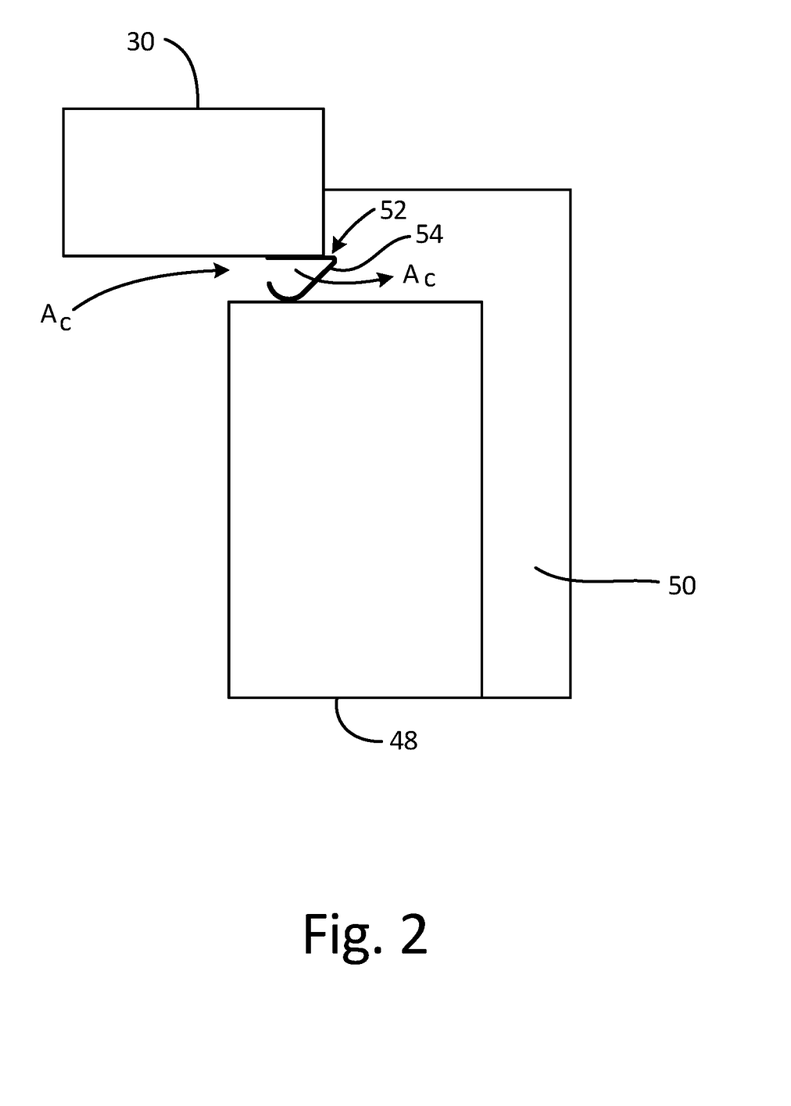
FIG. 2 is a schematic cross-sectional view of two static components in the gas turbine engine of FIG. 1.

During the operation of gas turbine engine 10, a portion of primary air $A_P$ can be bled off from at least one of LPC 14, HPC 16, and in between LPC 14 and HPC 16 for use as cooling air $A_C$ (shown in FIG. 2). Cooling air $A_C$ is used for cooling components of HPT 20 and LPT 22 and for pressurizing compartments therein to prevent ingress of exhaust air $A_E$. Therefore, HPT 20 and LPT 22 can operate at temperatures that are much higher than a turbine without cooling air, increasing the power and efficiency of gas turbine engine 10.

Depicted in FIG. 1 is one embodiment of the present invention, to which there are alternative embodiments. For example, engine 10 can be a three spool engine. In such an embodiment, engine 10 has an intermediate pressure compressor (IPC) between LPC 14 and HPC 16 and an intermediate pressure turbine (IPT) between HPT 20 and LPT 22, wherein the intermediate compressor is connected to the intermediate turbine with an additional intermediate shaft such that low pressure shaft, intermediate shaft and high pressure shaft are each concentrically and coaxially disposed around longitudinal engine centerline axis $C_L$.

FIG. 2 is a schematic cross-sectional view of HPT case 30 and mid-turbine frame 48. HPT case and mid-turbine frame 48 are adjacent static components that do not move relative to one another to nearly the same degree that the rotating spools move relative to the static components of gas turbine engine 10 (shown in FIG. 1). However, for reasons such as thermal expansion, HPT case 30 and mid-turbine frame 48 do move relative to one another in small but significant magnitudes.

Adjacent to HPT case 30 and mid-turbine frame 48 is compartment 50. Compartment 50 is bordered in part by both HPT case 30 and mid-turbine frame 48 and is pressurized by cooling air $A_C$ in order to prevent ingress of exhaust air $A_E$ (shown in FIG. 1). This helps limit or prevent heating of compartment 50 and HPT case 30 by exhaust air $A_E$.

In order to control the flow of cooling air $A_C$ into compartment 50, seal assembly 52 is positioned between HPT case 30 and mid-turbine frame 48. In the illustrated embodiment, seal assembly 52 is connected to HPT case 30 and is in contact with mid-turbine frame 48. Seal assembly 52 is flexible in order to maintain contact with both HPT case 30 and mid-turbine frame 48 during relative motion between the two. In a relaxed or uninstalled state, seal assembly 52 is significantly radially thicker than the distance between HPT case 30 and mid-turbine frame 48, so that, when installed, seal assembly 52 will be compressed so as to remain in contact with both components during their respective deflections. In addition, seal assembly 52 includes a plurality of ports 54 which meter the flow of cooling air $A_C$ into compartment 50.

Figure 3A:
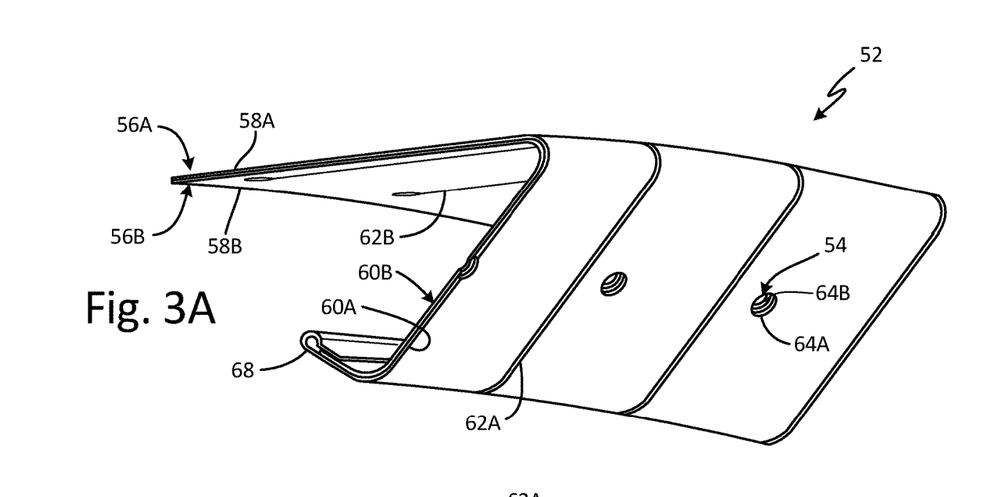
FIG. 3A is a perspective cross-sectional view of an embodiment of a seal assembly.
Figure 3B:
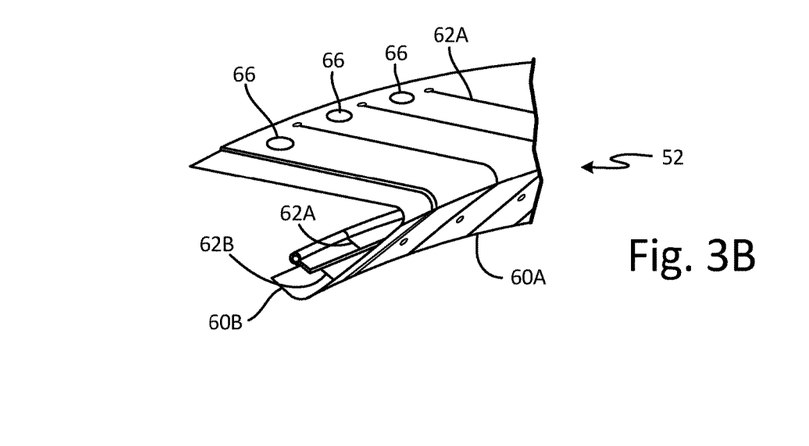
FIG. 3B is a different perspective cross-sectional view of the seal assembly of FIG. 3A.

FIG. 3A is a perspective cross-sectional view of seal assembly 52. FIG. 3B is a different perspective cross-sectional view of seal assembly 52. In the illustrated embodiment, seal assembly 52 forms at least a portion of a circular ring with a plurality of ports 54, and seal assembly 52 is comprised of two adjacent, coaxial sheets: outer layer 56A and inner layer 56B. Layers 56A and 56B are in contact with one another and outer layer 56A surrounds inner layer 56B. Layers 56A and 56B can be comprised of metal material, such as a nickel alloy, and can be coated to help limit or prevent wear. Outer layer 56A includes base 58A with a plurality of fingers 60A extending at an acute angle therefrom. Fingers 60A are separated by a plurality of evenly-spaced keyhole slots 62A, and each finger 60A includes an orifice 64A. Similarly, inner layer 56B includes base 58B with a plurality of fingers 60B extending at an acute angle therefrom. Fingers 60B are separated by a plurality of evenly-spaced keyhole slots 62B, and each finger 60B includes an orifice 64B. In the illustrated embodiment, orifices 64A and 64B each have circular shapes, while orifices 64B are larger and have more area than orifices 64A.

Outer layer 56A and inner layer 56B are joined by a plurality of fastening features 66. In the illustrated embodiment, each fastening feature 66 is a spot weld between in the bases 58A and 58B, though other types of fastening features can be utilized (i.e., the holes shown in FIG. 5). In addition, outer layer 56A captures inner layer 56B at free end 68 by contacting both sides of inner layer 56B. Outer layer 56A and inner layer 56B are connected such that slots 62A are laterally (e.g., circumferentially) spaced apart from slots 62B. Thereby, slots 62A are overlapped by fingers 60B and slots 62B are overlapped by fingers 60A. In addition, outer layer 56A and inner layer 56B are connected such that each pair of orifices 64A and 64B are coaxial (at least in the uninstalled state), forming ports 54. In this manner, orifices 64B are partially overlapped by orifices 64A in that the area of each orifice 64B extends beyond the area of the corresponding orifice 64A. As such, each orifice 64A is completely overlapped by the corresponding orifice 64B. Overall, the construction of seal assembly 52 has each slot 62A or 62B positioned in the central portion of a corresponding finger 60A or 60B and each port 54 is positioned approximately halfway between a slot 62A and a slot 62B. It should be noted that other arrangements are possible in further embodiments, such as with ports 54 positioned closer to slots 62A or slots 62B rather than halfway between slots 62A and 62B, etc. Moreover, seal assembly 52 can be flat or linear rather than ring shaped in further embodiments.

The result of the configuration of seal assembly 52 is that orifice 64B performs the function of metering cooling air $A_C$ (shown in FIG. 1) and orifice 64A is merely a clearance aperture that is sized as to not interfere with orifice 64B. As stated previously, during operation of gas turbine engine 10 (shown in FIG. 1), seal assembly 52 must flex in order to prevent excess cooling air $A_C$ from entering compartment 50 (shown in FIG. 2). More specifically, this is accomplished by fingers 60A and 60B bending and sliding across one another. Due to the complex relative movement that can occur between HPT case 30 and mid-turbine frame 48 (shown in FIG. 2), fingers 60A and 60B may move laterally and/or radially with respect to each other. This relative motion can misalign one or more pairs of orifices 64A and 64B. But because orifice 64B is significantly larger than orifice 64A, orifice 64B continues to completely overlap orifice 64A and does not inhibit the flow therethrough. Exactly how much larger to make orifice 64B than 64A can be dependent on a number of factors, for example, the diameter of seal assembly 52, the number and width of fingers 60A and 60B, the amount of axial and radial movement between HPT case 30 and mid-turbine frame 48, and the manufacturing tolerances involved in the fabrication of layers 56A and 56B and the assembly thereof into seal assembly 52. In general, each orifice 64B should be sized to be as small as possible without inhibiting the flow through the corresponding orifice 64A. This is done in order to minimize the size of each orifice 64B, which minimizes the resulting stress concentration in the corresponding finger 60B.

Figure 4:
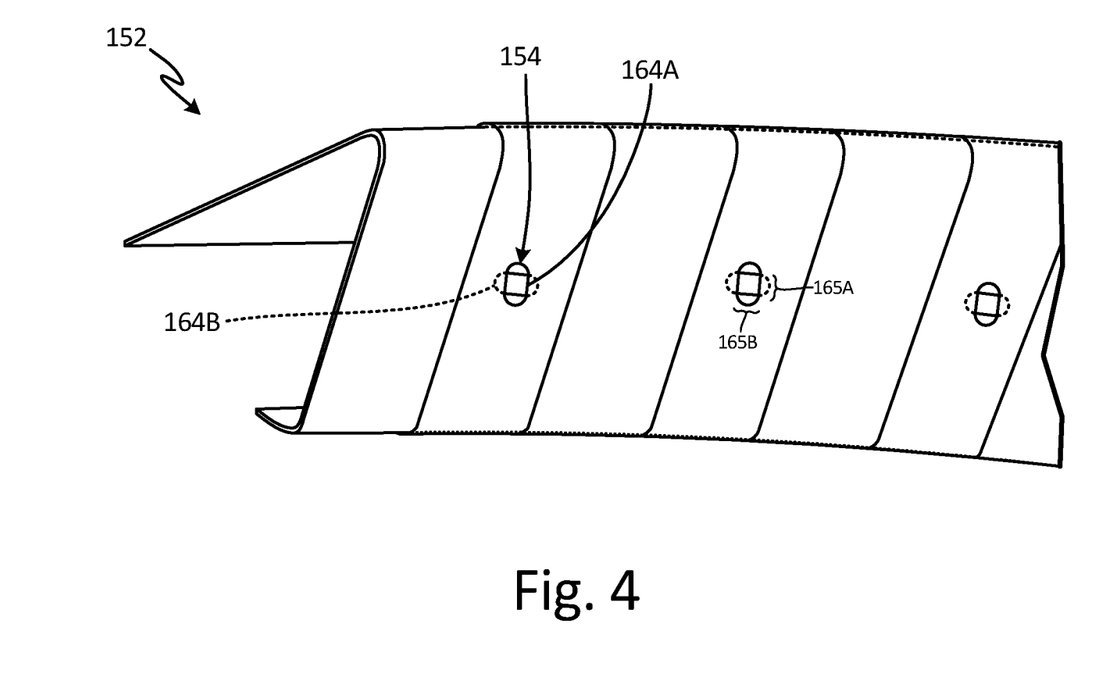
FIG. 4 is a perspective cross-sectional view of an alternate embodiment of the seal assembly.

FIG. 4 is a perspective cross-sectional view of alternate embodiment seal assembly 152. Reference characters used in FIG. 4 are increased by one hundred over the reference characters for similar structures in the embodiment of FIGS. 3A and 3B. Seal assembly 152 is substantially similar to seal assembly 52, although ports 154 are substantially differently shaped than ports 54 (shown in FIGS. 3A and 3B). Orifices 164A and 164B are each slots that extend in different directions. More specifically, in the illustrated embodiment, orifices 164A and 164B are each racetrack-shaped slots having constant-width center sections 165A and 165B with parallel sides. The result is that each orifice 164B is partially overlapped by an orifice 164A, and each orifice 164A is partially overlapped by an orifice 164B. Orifices 164A and 164B are arranged perpendicular to each other in the illustrated embodiment. Because orifices 164A and 164B are oriented perpendicularly to each other, orifices 164A extend radially farther than orifices 164B, and orifices 164B extend laterally (e.g., circumferentially) farther than orifices 164A.

The result of this configuration is that ports 154 have the net or resultant shape and area of the intersection of orifice 164A and 164B. Because the center sections 165A and 165B of orifices 164A and 164B are uniform, ports 154 remain the same size and shape even as orifices 164A and 164B move relative to each other. Thereby, the restriction of cooling air $A_C$ into compartment 50 remains constant regardless of the movement between HPT case 30 and mid-turbine frame 48 (shown in FIG. 2).

Alternatively, orifices 164A can be different sizes or shapes than orifices 164B. For example, port 154 can be formed using one racetrack-shaped orifice 164A and one circular-shaped orifice 164B (such as orifice 64B, shown in FIGS. 3A and 3B) in case the radial movement of the orifices with respect to one another is substantially larger than the lateral movement. In such an embodiment, orifice 164A can be wider than the diameter of orifice 164B in order to account for the smaller amount of lateral movement and prevent orifice 164B from obstructing the flow through orifice 164A.

Figure 5:
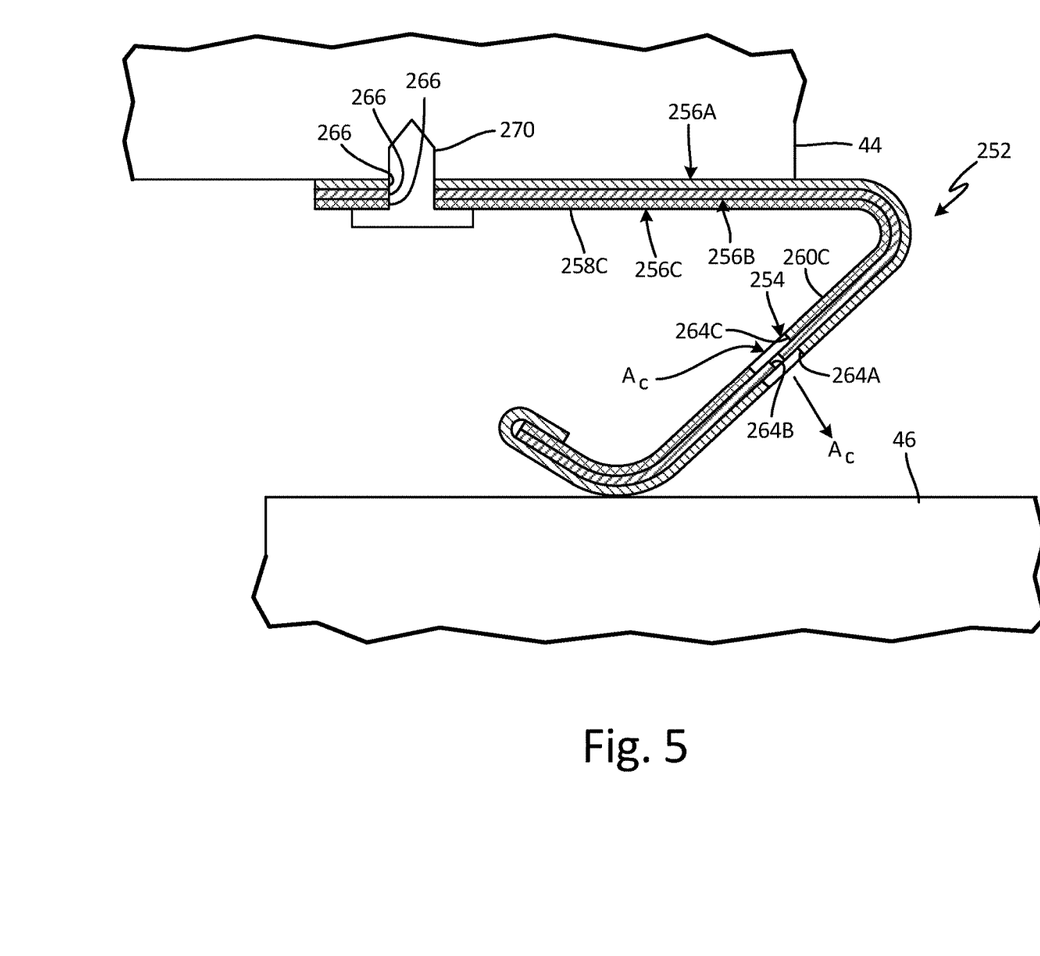
FIG. 5 is a schematic cross-sectional view of an alternate embodiment of the seal assembly.

FIG. 5 is a schematic cross-sectional view of alternate embodiment seal assembly 252. Seal assembly 252 is substantially similar to seal assembly 52, although seal assembly 252 is positioned between an LPT blade 44 and support rotor 46. Reference characters in FIG. 5 are increased by two hundred for similar structures as those the embodiment of FIGS. 3A and 3B. Furthermore, seal assembly 252 includes a third layer 256C that is in contact with layers 256A and 256B and is surrounded thereby. Third layer 256C includes base 258C and a plurality of fingers 260C extending at an acute angle therefrom. Fingers 260C are separated by a plurality of keyhole slots (not visible), and each finger 260C includes an orifice 264C. The three layers 256A-256C each include a fastening feature 266, which are holes through which fastener 270 passes, securing seal assembly 252 to LPT blade 44.

In the illustrated embodiment, orifice 264C which is the same size, shape, and area as orifice 264A. Thereby, orifice 264B orifice 64B performs the function of metering cooling air $A_C$, and orifices 264A and 264C are merely clearance apertures that are sized and shaped as to not interfere with orifice 264B. While the thicknesses of layers 256A-256C are equal, in an alternate embodiment, layer 256C is a much thinner foil layer that is positioned in between layers 256A and 256B.

Figure 6:
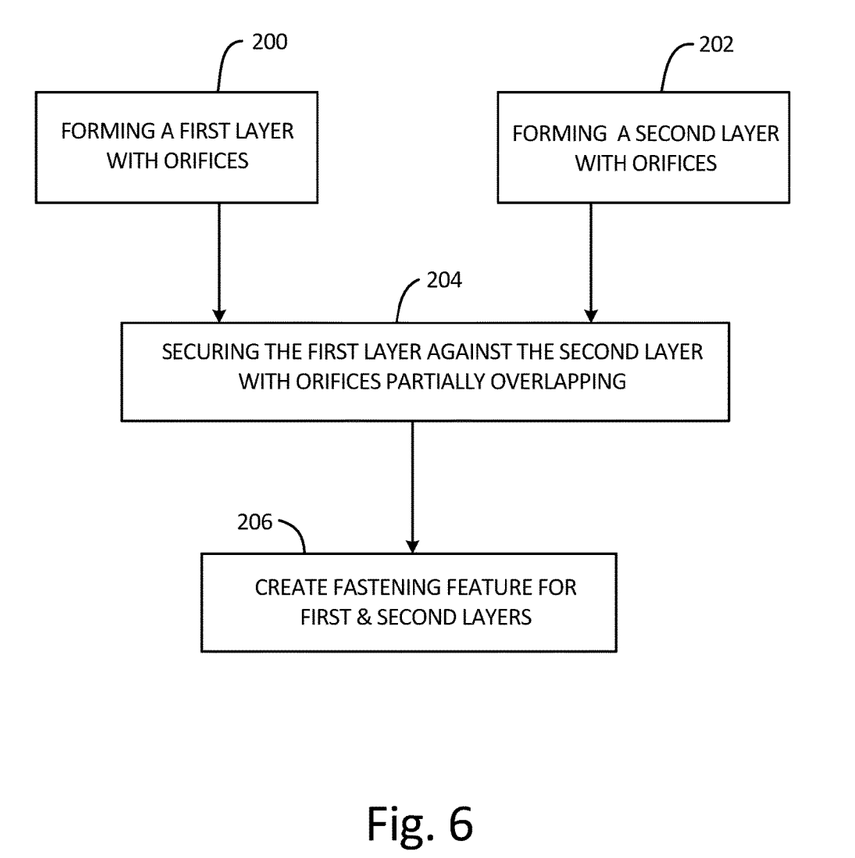
FIG. 6 is a flow chart of an embodiment of the method of manufacturing of the seal assembly.

FIG. 6 is a flow chart of an embodiment of a method of manufacturing seal assembly 52, 152, or 252. At step 200, the first layer 56A, 156A, or 256A is formed, for example, by drawing, stamping, extruding, cutting, and/or folding. Step 200 includes the forming of the orifices 64A, 164A, or 264A and keyhole slots 62A in the first layer 56A or 256A. Concurrently or at another point in time, at step 202, second layer 56B, 156B, or 256B is formed, for example, by drawing, stamping, extruding, cutting, and/or folding. Step 202 includes the forming of the orifices 64B, 164B, or 264B and keyhole slots 62B in the second layer 56B or 256B. At step 204, the layers 56A/56B or 256A/256B are coaxially aligned and secured against each other such that the slots 62A in the first layer 56A or 256A are laterally spaced apart from the slots 62B in the second layer 56B or 256B and such that the orifices 64A, 164A, or 264A in the first layer 56A or 256A partially overlap the orifices 64B, 164B, or 264B in the second layer 56B or 256B. At step 206, the fastening features 66 or 266 are created on the layers 56A/56B or 256A/256B for connecting the first layer 56A or 256A to the second layer 56B or 256B and to ensure proper relative orientation of the layers 56A/56B or 256A/256B to each other. For example, at step 206, layers 56A/56B or 256A/256B can be welded together. For another example, holes can be drilled through layers 56A/56B, 156A/156B, or 256A/256B for receiving fastener 270.

Discussion of Possible Embodiments

The following are non-exclusive descriptions of possible embodiments of the present invention.

A seal assembly according to an exemplary embodiment of this disclosure, among other possible things includes: a first layer comprising: a first base; and a first plurality of fingers extending from the first base wherein the first plurality of fingers are separated by a first plurality of slots and wherein each of the first plurality of fingers includes one of a first plurality of orifices; a second layer adjacent to the first layer, the second layer comprising: a second base; and a second plurality of fingers extending from the second base wherein the second plurality of fingers are separated by a second plurality of slots and wherein each of the second plurality of fingers includes one of a second plurality of orifices; wherein each of the first plurality of slots is spaced apart laterally from each of the second plurality of slots; and wherein the first plurality of orifices is partially overlapped by the second plurality of orifices such that a first area of each of the first plurality of orifices extends beyond a second area of each of the second plurality of orifices.

The seal assembly of the preceding paragraph can optionally include, additionally and/or alternatively, any one or more of the following features, configurations and/or additional components:

A further embodiment of the foregoing seal assembly, wherein each of the second plurality of orifices can have a first circular shape.

A further embodiment of any of the foregoing seal assemblies, wherein each of the first plurality of orifices can have a second circular shape wherein the first area is larger than the second area.

A further embodiment of any of the foregoing seal assemblies, wherein each of the first plurality of orifices can be coaxial with a corresponding one of the second plurality of orifices.

A further embodiment of any of the foregoing seal assemblies, wherein each of the first plurality of orifices can be a first slot extending in a first direction.

A further embodiment of any of the foregoing seal assemblies, wherein each of the second plurality of orifices can be a second slot extending in a second direction that is perpendicular to the first direction.

A further embodiment of any of the foregoing seal assemblies, wherein each of the second plurality of orifices can be a second slot extending in a second direction, wherein each of the first slot and the second slot have a uniform center section with a pair of parallel sides.

A further embodiment of any of the foregoing seal assemblies, wherein the seal assembly can further comprise: a plurality of fastening features for connecting the first base to the second base.

A further embodiment of any of the foregoing seal assemblies, wherein the seal assembly can form a circular ring.

A further embodiment of any of the foregoing seal assemblies, wherein the seal assembly can further comprise: a third layer adjacent to at least one of the first layer and the second layer, the third layer comprising: a third base; and a third plurality of fingers extending from the third base wherein the third plurality of fingers are separated by a third plurality of slots and wherein each of the third plurality of fingers includes one of a third plurality of orifices; wherein the third plurality of orifices is aligned with the second plurality of orifices and a third area of each of the third plurality of orifices extends beyond the second area of each of the second plurality of orifices A further embodiment of any of the foregoing seal assemblies, wherein the third area can be the same as the first area.

A method of manufacturing a seal according to an exemplary embodiment of this disclosure, among other possible things includes: forming a first layer including a first base and a first plurality of fingers extending from the first base wherein each of the first plurality of fingers are separated by one of a first plurality of slots and wherein each of the first plurality of fingers includes one of a first plurality of orifices; forming a second layer including a second base and a second plurality of fingers extending from the second base wherein each of the second plurality of fingers are separated by one of a second plurality of slots and wherein each of the second plurality of fingers includes one of a second plurality of orifices; securing the first layer against the second layer such that the first plurality of slots is laterally spaced apart from the second plurality of slots and the first plurality of orifices partially overlaps the second plurality of orifices; and creating a fastening feature on the first layer and the second layer for connecting the first layer to the second layer.

The method of the preceding paragraph can optionally include, additionally and/or alternatively, any one or more of the following features, configurations and/or additional components:

A further embodiment of the foregoing method, wherein generating a fastening feature can comprise welding the first layer to the second layer.

A further embodiment of any of the foregoing methods, wherein generating a fastening feature can comprise forming a plurality of fastening holes through the first layer and the second layer.

A further embodiment of any of the foregoing methods, wherein the method can further comprise: aligning the first layer to be coaxial with the second layer.

A gas turbine engine according to an exemplary embodiment of this disclosure, among other possible things includes: a first component; a second component; and a seal extending between the first component and the second component, the seal comprising: a base in contact with the first component; a finger region extending from the base and in contact with the second component; a plurality of ports through the finger region wherein each of the plurality of ports comprises: a first orifice with a first area; a second orifice with a second area; wherein the first area is partially overlapped by the second area such that the first area extends beyond the second area.

The gas turbine engine of the preceding paragraph can optionally include, additionally and/or alternatively, any one or more of the following features, configurations and/or additional components:

A further embodiment of the foregoing gas turbine engine, wherein the first component and the second component can be both static components.

A further embodiment of any of the foregoing gas turbine engines, wherein the first component and the second component can be both rotating components.

A further embodiment of any of the foregoing gas turbine engines, wherein the second area can be completely overlapped by the first area.

A further embodiment of any of the foregoing gas turbine engines, wherein the ring can extend from the base at an acute angle.

Summation

Any relative terms or terms of degree used herein, such as "substantially", "essentially", "generally", "approximately" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, alignment or shape variations induced by thermal, rotational or vibrational operational conditions, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodi-

The invention claimed is:

1. A seal assembly comprising:
   a first layer comprising:
      a first base; and
      a first plurality of fingers extending from the first base wherein the first plurality of fingers are separated by a first plurality of slots and wherein each of the first plurality of fingers includes one of a first plurality of orifices having a first area;
   a second layer adjacent to the first layer, the second layer comprising:
      a second base; and
      a second plurality of fingers extending from the second base wherein the second plurality of fingers are separated by a second plurality of slots and wherein each of the second plurality of fingers includes one of a second plurality of orifices having a second area smaller than the first area;
   wherein each of the first plurality of slots is spaced apart laterally from each of the second plurality of slots; and
   wherein the first plurality of orifices is overlapped by the second plurality of orifices such that the first area of each of the first plurality of orifices extends completely beyond the second area of each of the second plurality of orifices.

2. The seal assembly of claim 1, wherein each of the second plurality of orifices has a first circular shape.

3. The seal assembly of claim 2, wherein each of the first plurality of orifices has a second circular shape.

4. The seal assembly of claim 3, wherein each of the first plurality of orifices is coaxial with a corresponding one of the second plurality of orifices.

5. The seal assembly of claim 1, further comprising:
   a plurality of fastening features for connecting the first base to the second base.

6. The seal assembly of claim 1, wherein the seal assembly forms a circular ring.

7. The seal assembly of claim 1, further comprising:
   a third layer adjacent to at least one of the first layer and the second layer, the third layer comprising:
      a third base; and
      a third plurality of fingers extending from the third base wherein the third plurality of fingers are separated by a third plurality of slots and wherein each of the third plurality of fingers includes one of a third plurality of orifices;
   wherein the third plurality of orifices is aligned with the second plurality of orifices and a third area of each of the third plurality of orifices extends beyond the second area of each of the second plurality of orifices.

8. The seal assembly of claim 7, wherein the third area is the same as the first area.

9. A method of manufacturing a seal, the method comprising:
   forming a first layer including a first base and a first plurality of fingers extending from the first base wherein each of the first plurality of fingers are separated by one of a first plurality of slots and wherein each of the first plurality of fingers includes one of a first plurality of orifices having a first area;
   forming a second layer including a second base and a second plurality of fingers extending from the second base wherein each of the second plurality of fingers are separated by one of a second plurality of slots and wherein each of the second plurality of fingers includes one of a second plurality of orifices having a second area smaller than the first area;
   securing the first layer against the second layer such that the first plurality of slots is laterally spaced apart from the second plurality of slots and each one of the first plurality of orifices overlaps the corresponding one of the second plurality of orifices such that the first area of each of the first plurality of orifices extends completely beyond the second area of each of the second plurality of orifices; and
   creating a fastening feature on the first layer and the second layer for connecting the first layer to the second layer.

10. The method of claim 9, wherein generating a fastening feature comprises welding the first layer to the second layer.

11. The method of claim 9, wherein generating a fastening feature comprises forming a plurality of fastening holes through the first layer and the second layer.

12. The method of claim 9, further comprising:
   aligning the first layer to be coaxial with the second layer.

13. A gas turbine engine comprising:
   a first component;
   a second component; and
   a seal extending between the first component and the second component, the seal comprising:
      a base in contact with the first component;
      a finger region extending from the base and in contact with the second component;
      a plurality of ports through the finger region wherein each of the plurality of ports comprises:
         a first slot with a first area, the first slot extending in a first direction;
         a second slot with a second area, the second slot extending in a second direction that is perpendicular to the first direction;
         wherein the first area is partially overlapped by the second area such that the first area extends beyond the second area.

14. The gas turbine engine of claim 13, wherein the first component and the second component are both static components.

15. The gas turbine engine of claim 13, wherein the first component and the second component are both rotating components.

16. The gas turbine engine of claim 13, wherein the ring extends from the base at an acute angle.

17. The seal assembly of claim 13, wherein the first slot and the second slot have a uniform center section with a pair of parallel sides.

* * * * *